United States Patent [19]
Baehr et al.

[11] Patent Number: 5,839,050
[45] Date of Patent: *Nov. 17, 1998

[54] SYSTEM FOR DETERMINING RADIO LISTENERSHIP

[75] Inventors: Karl Baehr, Albuqurque, N. Mex.; George Chambers, Abilene, Tex.

[73] Assignee: Actual Radio Measurement, Alburquerque, N. Mex.

[*] Notice: This patent issued on a continued prosecution application filed under 37 CFR 1.53(d), and is subject to the twenty year patent term provisions of 35 U.S.C. 154(a)(2).

[21] Appl. No.: 895,343

[22] Filed: Jul. 16, 1997

Related U.S. Application Data

[63] Continuation of Ser. No. 385,482, Feb. 8, 1995, abandoned.

[51] Int. Cl.⁶ ................................................ H04B 7/00
[52] U.S. Cl. ...................................... 455/2; 455/226.4
[58] Field of Search .......................... 455/2, 226.4, 31.1, 455/226.3, 132, 140, 141, 150.1, 899; 348/1

[56] References Cited

U.S. PATENT DOCUMENTS

| | | | |
|---|---|---|---|
| 2,552,585 | 5/1951 | Rahmel et al. | 250/6 |
| 2,630,176 | 3/1953 | Horn et al. | 250/263 |
| 2,630,365 | 3/1953 | Rahmel | 346/37 |
| 2,630,366 | 3/1953 | Rahmel | 346/37 |
| 2,630,367 | 3/1953 | Rahmel | 346/37 |
| 2,861,176 | 11/1958 | Horn et al. | 250/2 |
| 2,896,070 | 7/1959 | Fremont et al. | 250/2 |
| 2,903,508 | 9/1959 | Hathaway | 178/6 |
| 2,947,858 | 8/1960 | Abbott | 250/2 |
| 2,958,766 | 11/1960 | Evans | 250/2 |
| 3,056,135 | 9/1962 | Currey et al. | 346/37 |
| 3,058,065 | 10/1962 | Freeman et al. | 325/31 |
| 3,126,513 | 3/1964 | Kamen e al. | 325/31 |
| 3,299,355 | 1/1967 | Jenks et al. | 325/31 |
| 3,397,402 | 8/1968 | Schneider | 346/37 |
| 3,434,150 | 3/1969 | Wernlund | 346/1 |
| 3,456,192 | 7/1969 | Mixsell et al. | 325/31 |
| 3,534,265 | 10/1970 | Mixsell et al. | 325/31 |
| 3,703,684 | 11/1972 | McVoy | 325/31 |
| 3,800,223 | 3/1974 | Mead | 325/31 |
| 3,849,729 | 11/1974 | Van Baggem | 325/31 |
| 3,947,624 | 3/1976 | Miyake | 178/6 |
| 4,258,386 | 3/1981 | Cheung | 358/84 |
| 4,361,851 | 11/1982 | Asip et al. | 358/84 |
| 4,577,220 | 3/1986 | Laxton et al. | 358/84 |
| 4,618,995 | 10/1986 | Kemp | 455/2 |
| 4,626,904 | 12/1986 | Lurie | 358/84 |
| 4,652,915 | 3/1987 | Heller, III | 358/84 |
| 4,769,697 | 9/1988 | Gilley et al. | 358/84 |
| 4,779,198 | 10/1988 | Lurie | 364/419 |
| 4,847,685 | 7/1989 | Gall et al. | 358/84 |
| 4,857,999 | 8/1989 | Welsh | 358/84 |
| 4,930,011 | 5/1990 | Kiewit | 358/84 |
| 4,955,070 | 9/1990 | Welsh et al. | 455/2 |
| 5,164,992 | 11/1992 | Turk et al. | 382/2 |
| 5,235,414 | 8/1993 | Cohen | 358/84 |
| 5,289,271 | 2/1994 | Watson | 348/1 |
| 5,410,724 | 4/1995 | Worthy | 455/2 |

*Primary Examiner*—David E. Harvey
*Attorney, Agent, or Firm*—Brian McCormack

[57] ABSTRACT

A remote radio listenership monitoring system including a digitally tuned scanning receiver disposed in an area adjacent to automobiles carrying radio receivers which radiate intermediate frequency signals corresponding to the frequency being amplified by that radio receivers, the receiver utilizes a narrowed filter scheme to sense the presence of an intermediate signal of a predetermined power level and rapidly polls a plurality of selected target frequencies. The system compiles target "hits" in a local memory device to create a database for that local unit. Periodically, the databases are transferred to a central processing station where individual local unit databases are compiled into a comprehensive report. Communication between the remote local units and the central processing station may be accomplished through a hard wired or cellular link. Updates to the system software and new target frequency data are transferred back to the remote units by the central processing station.

20 Claims, 3 Drawing Sheets

SYSTEM FOR DETERMINING RADIO LISTENERSHIP

This application is a continuation of application Ser. No. 08/385,482, filed Feb. 8, 1995, now abandoned.

BACKGROUND AND FIELD OF THE INVENTION

This invention relates to a remote listenership monitoring system for use in compiling programming audience data for radio broadcast stations. In particular, the present invention relates to a system and apparatus for sensing, processing, and compiling listenership information for a number of radio stations simultaneously though the provision of a roadside monitoring apparatus which senses the intermediate frequency signals generated by passing automobile radio receivers.

A significant statistic to any commercial radio program in the United States today is the share of the available audience captured by that program. Monthly audience share data, known as "ratings," are published by commercial survey firms which rank local stations across segmented time slots. Higher ratings translate into higher advertising revenues, and thus commercial radio stations are keenly interested in ratings information.

In the past, listenership information was commonly gathered through listener surveys or through listener diaries. Ratings surveys were conducted by operatives who interviewed randomly sampled households to determine listenership information. Listener diaries firms distributed manual entry diaries wherein listeners were asked to maintain a log of the radio programs heard and the number of people listening. Both of these systems suffer from inherent inaccuracy in that survey respondents and diary recipients have been known to misreport actual listening patterns to favor certain programming and to avoid admitting listening to certain less sophisticated programming. Surveys cannot practically achieve a true random sample in that a significant segment of the population is not available during typical polling hours to respond to telephone or personal inquiries, thereby producing a skewed survey universe. In addition, diary recipients often fail to accurately or diligently enter listenership information resulting in gross inaccuracies. Both of these systems also require significant expense and time to complete a single ratings analysis. Analysis of this data across selected time slots is also very difficult to obtain accurately.

A further drawback in prior listenership monitoring systems has been the failure of such systems to accurately measure listenership for automotive receivers. With television's dominance of the in-home entertainment market, the most important audience sources for radio programming is now the so-called "drive times" denoting the primary commuting hours when large numbers of people are tuned into automotive radio receivers. Telephone or personal surveys of automotive listenership are inherently inaccurate given that it is difficult to reach listeners within a reasonable time after leaving the vehicle. Further, automotive listeners are known to frequently change channels, leaving survey respondents in doubt as to actual listening patterns. Diary responses are similarly inadequate for automotive receiver listeners.

The limitations and shortcomings in conventional survey and diary listenership systems have led others to attempt to create an improved listenership system. Very early solutions to these problems consisted of dedicated in home monitoring units which logged stations and active periods for receivers by direct interaction with the tuner of the radio or television being monitored. These systems required time consuming and expensive monitoring, often requiring technicians to visit each monitored location on a periodic basis. The expense of the monitoring units combined with high maintenance costs has prevented this system from being widely used.

Others have attempted to remotely monitor and compile listenership information. An early such attempt is disclosed in U.S. Pat. No. 2,958,766 issued to Evans. Instead of relying on listener diaries or surveys, the Evans system utilizes an automatic listenership detection and monitoring apparatus which requires that a specialized apparatus be integrated within the radio being monitored. The audio signal chosen by the listener is sampled periodically by sensing the signal from the speaker coil which is then transmitted over telephone lines to a central processing station where these signals are compared to available local station signals to determine the monitored stations. Data was compiled on a mechanical counter or indicator devoted to each individual station being monitored. The specialized equipment and communication facilities necessary for this system make it wholly inadequate to monitor listenership for automotive receivers.

A variation on this idea is disclosed in U.S. Pat. No. 4,955,070 issued to Welsh et al. The Welsh system utilizes an automatic listenership detection and monitoring apparatus which requires that specialized apparatus be placed adjacent to the radio being monitored. The Welsh system places an audio microphone and processing circuit adjacent to each receiver sought to be monitored which derives an audio signal of the station being received by the home tuner. The monitoring unit is also provided with a tuner and audio amplifier which samples stations within the band being monitored to locate a signal which matches the audio signal received. Again, this system is ill suited for automotive receiver monitoring.

Because of the difficulty inherent in systems such as are disclosed in Evans and Welsh, other sought to discover a method of listenership measurement which could be accomplished remotely without requiring contact with the receiver being monitored. All radio and television receivers utilize a frequency shifting technique to isolate the internal amplified signal from the carrier frequency being received. The resultant signal known as an "intermediate frequency" may be sensed within the general area of the receiver as a radiated signal. The intermediate frequency for FM band stations is 10.7 MHz above the station's center frequency. For AM band stations, the intermediate frequency is 455 KHz above the station's assigned carrier frequency. By sensing the intermediate frequency, the station selected by a particular receiver may be determined remotely. This phenomenon has resulted in a number of remote listenership systems.

One such remote listenership system is described in U.S. Pat. No. 3,434,150 issued to Wernlund. The Wernlund patent is directed to a remote sensing device which detects the intermediate frequency signals of home and auto radio receivers. With respect to auto receivers, Wernlund discloses a geometric antenna placement pattern designed to maximize the signal to noise ratio of the device with respect to the desired intermediate frequency signal. The Wernlund system employs dual dipole antennae placed on opposite sides of an expected automobile pathway. By connecting such antennae differentially, noise emanating from the outside of the region between the antennae is minimized while signals such as the desired intermediate frequency occurring between the antennae are maximized. In order to maximize the sensitivity of the device, the entire input signal is applied to a series of individual receiver modules tuned to frequencies associated with preselected radio stations. This device, and those similar to it, suffer from a common deficiency associated with early attempts to remotely sense an intermediate signal from a radio receiver. Because these signals are so weak, this system utilizes a narrow band filter and tuner amplifier devoted to each frequency of interest. The patent teaches that the low power of the intermediate frequency signal requires that dedicated tuning circuits be used with each desired channel. A significant drawback of this approach is that each time the unit is used to measure listenership, the individual tuning and filter circuits must be adjusted to each frequency of interest. Further, the provision of a dedicated tuner and filter circuit significantly increases the cost of the monitoring unit. Still further, these dedicated units were incapable of accurately measuring AM band intermediate frequencies.

A variation on prior listenership measurement systems is set forth in U.S. Pat. No. 3,299,355 to Jenks et al. The Jenks patent discloses an aircraft based radio and television audience survey system which again senses the intermediate frequency of a consumer radio and television receivers. The Jenks system employs a series of narrow band pass filters which select components from a broad frequency antenna mounted on the underside of an aircraft. A set of nine individual receivers are utilized to detect the desired intermediate frequencies, the output of which is amplified and heterodyned with a crystal based signal. In this manner, individual intermediate frequency signals associated with a particular channel of interest may be isolated and counted.

Once listenership data is captured through surveys, diaries, or direct measurement, this data is then used to produce a representation of the listenership associated with each frequency of interest. Prior listenership measurement techniques have been unsatisfactory in that inaccuracies and bias in the listenership data collected cannot be adequately compensated for in conventional techniques. In addition, technical limitations in measurement devices have limited the ability of such statistical techniques to accurately reflect automobile and radio listenership.

Thus, prior listenership monitoring systems and apparatus have not been wholly satisfactory. Prior systems suffer from the requirement that the receivers being monitored must be modified or brought into close contact with the monitoring apparatus. Further, prior art systems were unduly cumbersome in operation and significantly more expensive due to the use of a dedicated tuner and filter circuit for each frequency of interest. Still further, prior art listenership monitoring systems suffered from inaccuracies associated with analog tuning circuits and filters. Still further, prior listenership monitoring systems were incapable of efficiently monitoring automobile or mobile receiver units. Still further, prior listenership monitoring systems were incapable of efficiently storing listenership data within the monitoring unit. Still further, prior listenership monitoring systems did not utilize enhanced analysis techniques to ensure that measured results accurately reflected listenership data. Still further, prior listenership monitoring systems often required manual collection of data and did not provide a method by which users could access listenership reports on a real time basis. Still further, prior remote listenership systems required on site retrieval of compiled data and further required on site adjustment to monitor a different set of target frequencies.

The aforementioned shortcomings of the prior art are by no means exhaustive; however, they demonstrate that listenership monitoring systems of the past have been less than completely satisfactory and room for significant improvement exists.

SUMMARY OF A PREFERRED EMBODIMENT

This invention relates to an improved radio listenership monitoring apparatus and system for use in measuring the number of radio listeners tuned into a particular station at any one time within a specified geographic area, typically a single metropolitan radio market area. More specifically, the apparatus and system relates to a series of digitally tuned, scanning type receivers which are modified to selectively sense proximal signals representing the intermediate frequency of standard automotive or portable radio receivers. The present invention is provided with tuned antenna structures to permit high gain reception of both FM and AM signals. The present invention is further provided with a specialized filter scheme to permit greater accuracy with respect to the measured signals and to avoid errors. The filter scheme of the present invention permits the system to reject much of the noise associated with prior systems. The scanning digital tuner provides the capability to sense the presence of low power intermediate frequency signals on up to 25 channels simultaneously. Each channel is polled at least fifty times per second to ensure accurate measurement of all passing receivers. The scanning receiver units of the present invention are further provided with a processing unit which debounces all polled inputs and records each input in a time/channel matrix. Data is captured showing total hits and the time distribution of such hits in an on-board memory storage device. The high level central processor of the present invention creates a fully functional listenership database which reduces the error rate typically associated with listenership monitoring. The scanning receiver units are distributed throughout the territory to be surveyed and situated adjacent roadways likely to carry significant traffic flow. The scanning receiver units are further provided with communication means to permit remote data collection at a central host computer. That central host computer further process listenership data to create a historical listenership report. The central host computer is further provided with remote access means to permit customers to gain on-line access to listenership reports in real time.

OBJECTIVES OF THE INVENTION

It is therefore a primary object of the present invention to provide an improved listenership monitoring and reporting system which utilizes a digitally tuned, scanning type receiver.

It is a further object of the present invention to provide an improved listenership monitoring and reporting system which is modified to accurately sense proximal signals representing the intermediate frequency of standard automotive or portable radio receivers.

It is another object of the present invention to provide an improved listenership monitoring and reporting system which tuned antenna structures to permit high gain reception of both FM and AM signals.

It is a still further object of the present invention to provide an improved listenership monitoring and reporting system which is provided with a specialized filter scheme to permit greater accuracy with respect to the measured signals and to avoid errors.

It is a further object of the present invention to provide an improved listenership monitoring and reporting system which includes a superior filter scheme which permits the system to reject much of the noise associated with prior listenership monitoring systems.

It is another object of the present invention to provide an improved listenership monitoring and reporting system which includes the capability to sense the presence of low power intermediate frequency signals on up to 25 channels simultaneously.

It is a still further object of the present invention to provide an improved listenership monitoring and reporting system in which each channel is polled at least fifty times per second to ensure accurate measurement of all passing receivers.

It is a further object of the present invention to provide an improved listenership monitoring and reporting system which is provided with a high level central processing unit which debounces all polled inputs and records each input in a time/channel matrix.

It is another object of the present invention to provide an improved listenership monitoring and reporting system which stores raw listenership data within the unit housing the present invention.

It is another object of the present invention to provide an improved listenership monitoring and reporting system which processes raw listenership data within the unit housing the present invention.

It is a still further object of the present invention to provide an improved listenership monitoring and reporting system which reduces the error rate typically associated with listenership monitoring.

It is a further object of the present invention to provide an improved listenership monitoring and reporting system which carries out its extrapolation calculations and manipulations of raw listenership data within the unit housing the present invention.

It is a further object of the present invention to provide an improved listenership monitoring and reporting system which communicates processed listenership data to a central host computer.

It is a still further object of the present invention to provide an improved listenership monitoring and reporting system which includes the capability of permitting customers to access listenership reports on-line.

DETAILED DESCRIPTION

Figure 1:
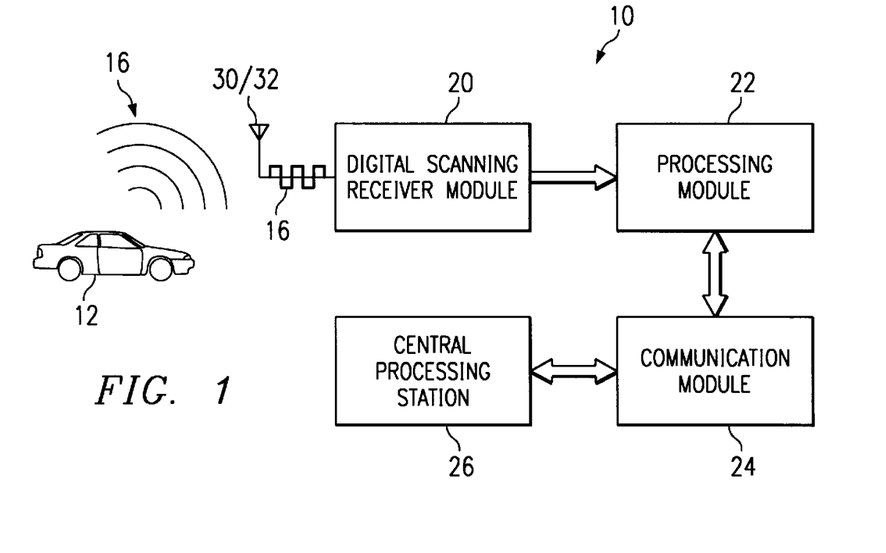
FIG. 1 is a schematic block diagram detailing the principal system elements of the present invention.

Referring now to the drawings wherein like numerals indicate like parts, in FIG. 1 the numeral 10 generally indicates the radio listenership measurement and evaluation system of the present invention.

The radio listenership measurement and evaluation system of the present invention 10 utilizes the radiated component of the so-called intermediate frequency signal generated by all conventional radio and television receivers to directly measure the number of receiver units tuned to a frequency of interest. All licensed amplitude modulated (AM) and frequency modulated (FM) broadcast stations are assigned to a particular frequency within a given geographic region. When an automobile 12 travels within the given geographic region, the automobile's antenna 14 receives the individual frequencies or stations and amplifies the audio carried on their signals internally. In order to isolate the internal receiver signal from the received signal, the amplifier of the auto receiver shifts the received signal by a predetermined offset to produce an intermediate signal 16. For FM stations, the intermediate signal is 10.7 MHz above the station's assigned frequency. For AM signals, the intermediate signal 16 is provided at 455 KHz above the station's assigned frequency. All FM intermediate frequencies are calculated by taking the center frequency and adding 10.7 MHz, while all AM intermediate frequencies are calculated by taking the center frequency and adding 455 KHz. For example the FM signal 98.1 MHz has an intermediate frequency of 108.8 MHz. Throughout the United States, no station is assigned to the frequency corresponding to the intermediate frequency of another station to avoid interference. These intermediate frequencies range from 500 KHz to 120 MHz, incorporating the standard AM & FM radio bands, and such intermediate frequencies typically carry a 5 to 25 kilohertz bandwidth. Within the automobile receiver, additional electronic circuits convert the intermediate signal into an audio signal for the car's speakers.

An automobile radio actually retransmits its intermediate frequency signal 16 as a result of leakage from the receiver amplifier circuits. Although intermediate signal 16 is a very low power signal (on the order of 20 to 100 milliwatts for FM signals and 60–100 microvolts for AM signals), this signal can be sensed and amplified in the region near the receiver. The presence of this radiated intermediate signal 16 forms the basis of the present invention. The present invention is primarily, although not exclusively, intended for use in measuring automobile or personal portable radio receiver listenership. As a result, the primary application of the present invention is to install the invention adjacent a roadway to monitor and count the listenership of passing automobiles.

The listenership measurement and evaluation system of the present invention consists of several primary subsystems. A digital scanning receiver module 20 is provided to accurately sense and measure the intermediate frequency signals 16 of passing automobiles. Sensed "hits" representative of the intermediate frequency of a passing automobile are then transmitted to processing module 22. Processing module 22 receives each hit and stores such inputs in a database reflecting the number and time of the hits associated with each frequency of interest. Processing module 22 continuously updates its database to permit real time reporting of listenership data. Reporting of listenership data is accomplished through communication module 24. Because the present invention is designed to be implemented in a number of listenership monitoring units distributed in remote locations, communication module 24 is designed to permit periodic reporting of compiled listenership data to a central processing station 26 through the use of conventional or cellular telephone lines or over a wired network. Central processing station 26 compiles reports from all field units into a single database reflective of listenership across a particular region of interest. Central processing station 26 is further provided with means to permit on-line access to listenership data from remote locations.

Figure 2:
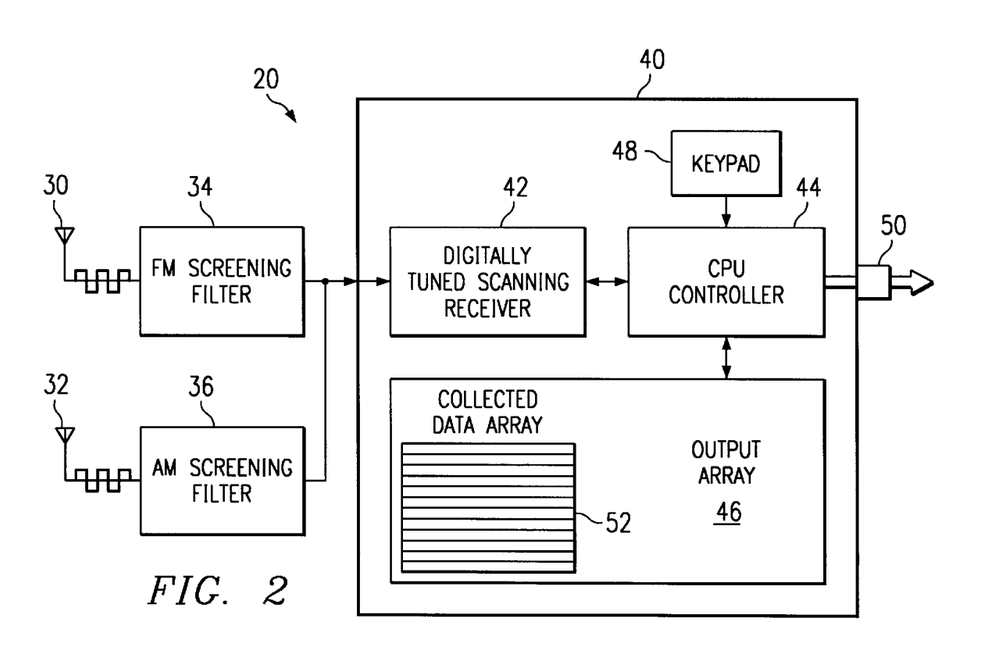
FIG. 2 is a schematic block diagram detailing the digital scanning receiver module of the present invention.

With reference to each of the specific sub-systems of the present invention, FIG. 2 depicts the digital scanning detection receiver module 20 of the present invention in greater detail. The FM signals analyzed by scanning receiver module 20 are collected through a high gain antenna 30 such as a Yagi 7 element or other highly sensitive antenna such as the Lersen PO-MN Diamond D 505 High Gain Wip Antenna. The AM signals are collected through a fiberglass wip antenna 32 specially built to detect AM intermediate frequencies. This specially designed AM antenna 32 is a fiberglass wip antenna having an electrical length equal to approximately 100 meters and produces a high net antenna gain for AM signals.

The FM signals collected by antenna 30 are first passed through an FM screening filter 34 to exclude spurious signals. FM screening filter 34 consists of a high pass filter which passes frequencies in excess of 98 MHz. AM signals collected by antenna 32 are first passed through an AM screening filter 36. AM screening filter 36 consists of a low pass filter which passes frequencies below 2.2 MHz.

Filtered FM and AM signals are then fed into scanning receiver assembly 40. Scanning receiver assembly 40 consists of a specially modified digitally tuned scanning receiver 42, CPU controller 44 and output array 46. Scanning receiver 42 accepts a series of user configurable target frequencies which are polled sequentially and compared with received inputs to determine whether a non-negligible signal is present on any of the target frequencies. Commercial scanning receivers covering the frequency range of 0.5 MHz to 120.0 MHz such as the AR-3000 manufactured by AOR, Ltd. are suitable for this purpose. The scanning receiver of the present invention should also be capable of polling its target frequencies at least at the rate of fifty channels per second. Commercial scanning receivers have a typical channel bandwidth which is too large to accurately discriminate between adjacent channels. As a result, the scanning receiver 42 of the present invention is modified to limit the bandwidth assigned to each frequency of interest to 5 KHz through the placement of 5 KHz Butterworth filters in the intermediate frequency detection circuits or other methods well known in the art. In addition, commercial scanning receivers are designed to detect relatively strong signals associated with broadcast stations or two way communication radios. Because of the low power of the intermediate signal 16 of the present invention, the sensitivity of the scanning receiver 42 must be adjusted to sense signals normally too weak to trigger a "hit." While the level of sensitivity required is a function of proximity of the system antennae to the automobiles being monitored, in general, the scanning receiver of the present invention must be able to sense signals having a very low nominal power, e.g. field strengths on the order of microvolts. The scanning receiver CPU 44 is further modified to debounce each received hit within 0.3 seconds of that signal being detected. This is necessary to ensure that multiple automobiles passing through the detection zone simultaneously are adequately monitored.

Each "hit" sensed by the scanning receiver 42 is passed along through CPU 44 to output array 46. CPU 44 controls the scanning sequence of receiver 42 and permits easy programming of new target frequencies into the device through an input keypad 48. Because scanning receiver 42 is digitally tuned, a virtually limitless variety of frequencies within the bandwidth of the device may be programmed into the present invention without mechanical adjustment of the device. This is in contrast to prior art systems wherein an individual analog tuner circuit was constructed or configured for each frequency of interest. Reconfiguring the digital scanning receiver 42 for different frequencies of interest is a simple matter of entering the desired frequencies using keypad 48.

"Hits" detected by scanning receiver 42 are sensed by CPU 44 and stored in output array 46. Output array 46 consists of a 256K dynamic random access memory chip segmented into an array of sixteen bit words consisting of pairs of eight bit cells. As each "hit" is sensed by the device, a sixteen bit word representing the frequency sensed and the time of the sensed hit is stored in the array 46, which, when amassed into a set of raw listenership data is known as collected data array 52. The receiver module is further provided with a serial data port 50 which is in communication with CPU 44. Periodically, CPU 44 transfers collected data 52 from array 46 to serial port 50 for transfer to the processing module 22 of the present invention.

Figure 3:
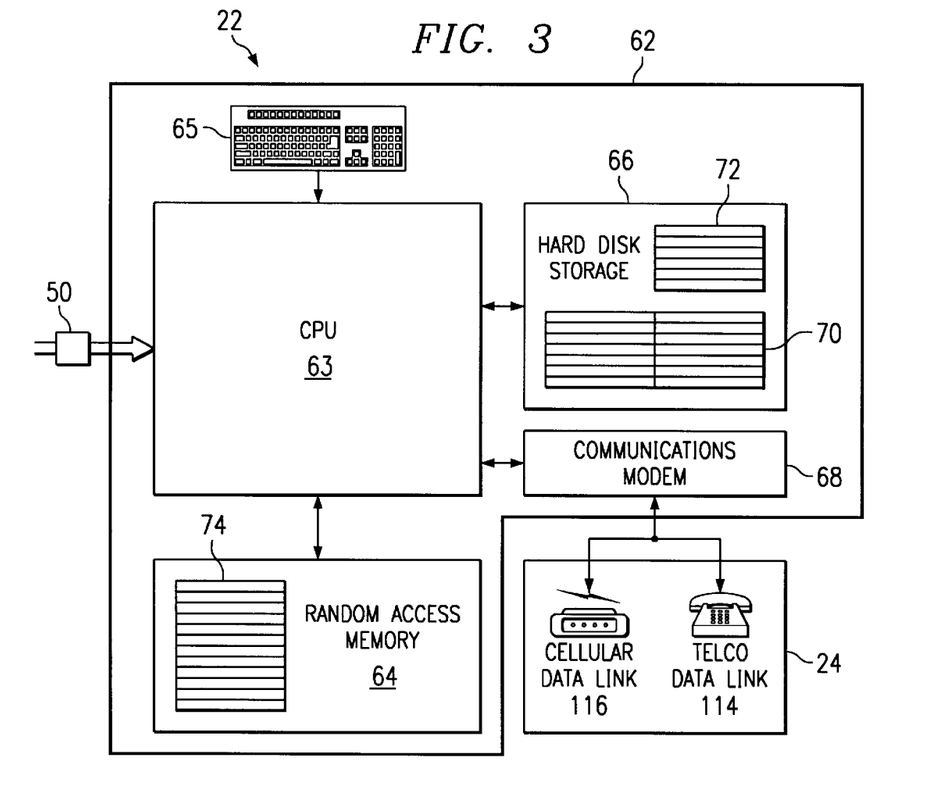
FIG. 3 is a schematic block diagram detailing the listenership data processing module of the present invention.

With reference to FIG. 3, processing module 22 of the present invention accepts raw listenership data from scanning receiver module 40 and processes such data to produce a report reflective of listenership for the frequencies being monitored. Processing module 22 is advantageously comprised of a dedicated portable computer 62 utilizing an Intel 80486 processor architecture running at 33 MHz or faster. Computer 62 is provided with at least four megabytes of dynamic random access memory 64 and at least eighty megabytes of hard disk storage 66. Computer 62 is further provided with a communications modem 68 to permit remote communication over wired or cellular telephone links. Alternatively, computer 62 may be provided with a specialized interface to permit communication over a local or wide area network.

Figure 4A:
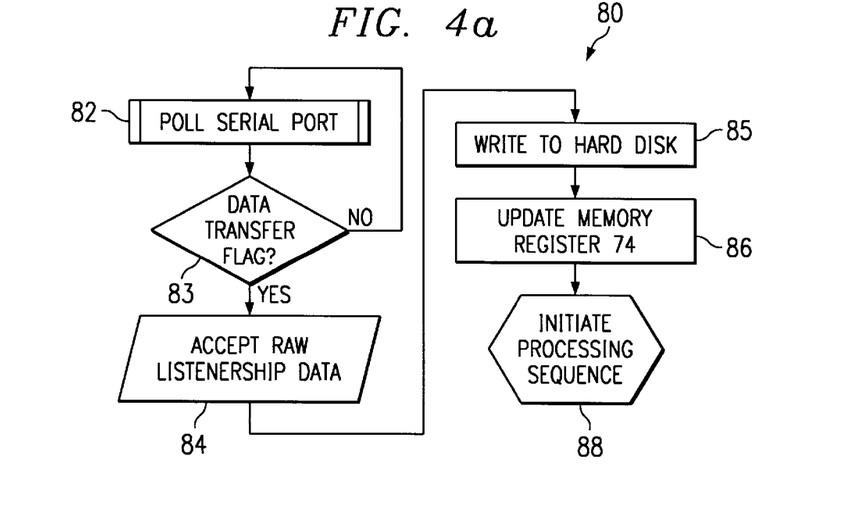
FIG. 4a is a flow chart block diagram detailing the data acquisition scheme of the present invention.

Computer 62 is programmed with a specialized data acceptance and processing scheme to permit the creation and maintenance of a listenership database 70 in real time. Computer 62 is also provided with a multitasking operating system to permit simultaneous data acquisition and processing to take place. In the data acquisition phase of operation, computer 62 executes the series of data acquisition steps 80 illustrated in FIG. 4a. The data acquisition phase begins in step 82 with computer 62 polling its serial port 63 which is connected via hard link to the receiver module serial port 50. Upon detection of a data transfer flag 83, computer 62 accepts raw listenership data arrays 52 from scanning receiver module 40 and immediately writes each array to a raw data set 72 maintained on hard disk 66 for permanent storage as in step 84 and 85. After each data transfer, memory register 74 is updated to reflect the date and time of the latest data transfer in step 86. At the end of the data transfer, processing sequence 90 is initiated in step 88.

Figure 4B:
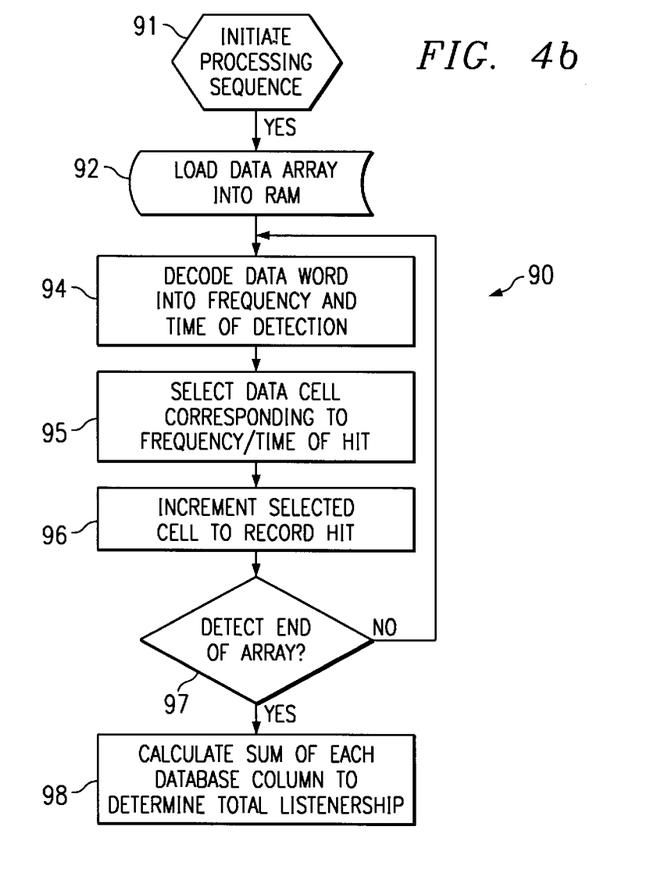
FIG. 4b is a flow chart block diagram detailing the data processing scheme of the present invention.

As illustrated in FIG. 4b, processing sequence 90 is designed to transform raw listenership data received from scanning receiver module 40 into a statistical model which accurately reflects the stations being received by passing motorists in listenership database 70. Upon the occurrence of flag 91, newly entered data resident on hard disk 66 is first read into RAM 64 for processing in step 92. Each data word in collected data array 52 is read and decoded to determine the frequency of the "hit" associated with the word and the time of the entry as shown in step 94. A biordinal listenership database 70 is provided on hard disk 66. Listenership database 70 includes a separate column of data for each frequency of interest. Each row in database 70 represents a different fifteen minute increment of time over a twenty-four hour period. As each word from data array 52 is decoded, the value currently resident in the data cell corresponding to the frequency and time indicated by that word is incremented by one unit as in step 96. In this manner, a listenership database reflective of the time and frequency distribution of the radio station preferences of passing motorists is created. At the end of each processing sequence, the sum of all entries in each column is calculated to reflect total listenership for each frequency of interest as in step 98. A new listenership database 70 is created for each day during the monitoring period and each day is stored as a database page indexed by date.

Computer 62 further manipulates this data upon demand to produce a final report 78 associated with each frequency of interest. Listenership data is organized by day of the week, time of day, geographic distribution, and audience share with respect to the other frequencies being monitored. Additional groupings showing listenership during drive times and evening hours are calculated. Because the marginal cost involved in monitoring additional frequencies other than the frequencies of interest is so low, all frequencies in a particular market may be monitored to capture a true measure of radio listenership. Thus, even though a particular station is not part of a current survey, a full survey may be produced to accurately determine audience share. Thus, the final report produced by the present invention is more accurate and more robust than prior listenership measurement systems.

The listenership monitoring system of the present invention is further provided with a communications module 24, shown in greater detail in FIG. 3. Communications module 24 is designed to permit remote database collection and system monitoring. Because the listenership monitoring system of the present invention is intended to be employed along roadsides and in other remote locations, it is highly advantageous to have a means for communication with each unit in the field from a central location. Prior remote listenership monitoring systems required manual inspection of each unit periodically to collect listenership data. Computer 62 is provided with a conventional modem 112 and supporting software. At preset intervals during the day, advantageously every three hours, computer 62 automatically dials the telephone number corresponding to the host central processing station 26 through a hard wired telephone line 114 or cellular telephone link 116. During each such interval, the latest version of the current listenership database 70 or the latest final report produced by computer 62 is transferred to the host processing station 26 over the telephone link. Alternatively, the system may be provided with a local or wide area network and supporting software. During such communication periods, updates to the software or data sets contained in the receiver processing modules 22 may be downloaded from the host processing station 26. As a result, new target frequencies may be added to the system without having a technician retrieve the unit. CPU 63 updates digital scanning receiver 42 with updated target frequencies upon receipt of same from host processing station 26.

Figure 5:
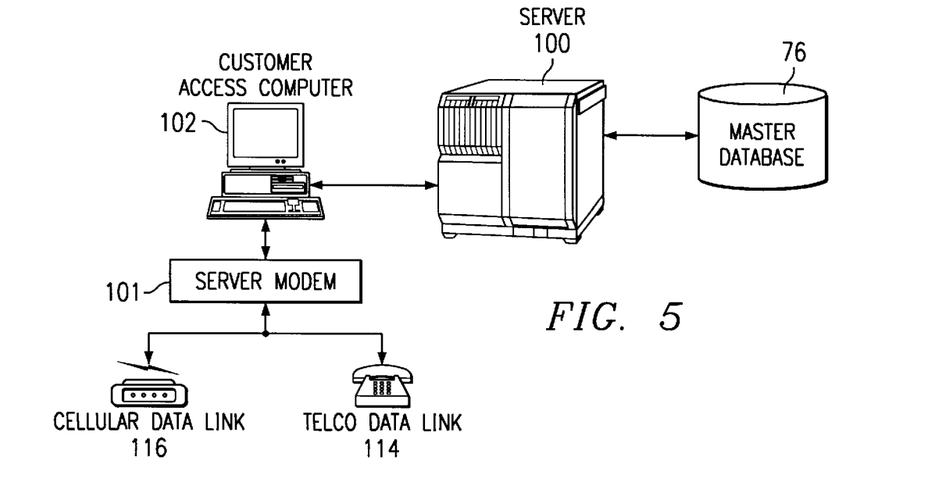
FIG. 5 is a schematic block diagram detailing the host processing station module of the present invention.

With reference to FIG. 5, host processing station 26 is provided with a high speed file server 100 such as the ProSignia™ file server manufactured by Compaq Computer Corporation and supporting software. Host processing station 26 accepts inputs from all field units through a server modem 101 and compiles a master database 76 corresponding to the collected entries. The software supporting server 100 updates data associated with each frequency and location of interest with newly received data for the current date. With the passing of each day, the last version of the listenership database page for that date is placed in long term storage. Any final reports produced by computer 62 are also placed in long term storage. In this manner, master database 76 contains both the most current listenership data for the surveyed frequencies as well as historical data.

Host processing station 26 is further provided with a customer access personal computer 102, telephone modem 101 and supporting remote access software such as the Norton PC Anywhere™ software utility. At regular intervals, server 100 downloads the most current version of the final report 78 into customer access computer 102 in association with a grouping of customer passwords. Customer access computer 102 may be controlled remotely by authorized customers to obtain listenership reports on line. Each customer is provided with a password permitting access to the customer access computer 102 and a further access code permitting that customer to download that portion of the final report which relates to that customer and relevant market. In this manner, customers are provided with on line access to listenership data in real time.

SUMMARY OF MAJOR ADVANTAGES

The present invention provides an improved listenership monitoring and reporting system which directly senses proximal signals representing the intermediate frequency of standard automotive or portable radio receivers. The system employs a digitally tuned, scanning type receiver which permits efficient coverage of the entire bandwidth of interest. Configuring the system to measure different frequencies does not require modification of the receiver circuits or returning of those circuits as in prior analog devices. The present invention also utilizes a specialized filter scheme to permit greater accuracy with respect to the measured signals and to avoid errors. Further, the high degree of sensitivity of the system coupled with the use of high gain antennae permits the present system to accurately measure AM intermediate frequency signals which represents a significant advance over prior art devices.

These features combine to accommodate the monitoring and reporting of low power intermediate frequency signals on up to 25 channels simultaneously while ensuring that passing high speed motorists do not escape detection. The high level central processing provided with the system controls the collection of raw data and performs processing of said data in the field to produce an accurate report of listenership information and utilizes a unique extrapolation technique which reduces the error rate typically associated with listenership monitoring. Still further, the present invention permits the automatic collection of listenership reports from remote units within a central host computer. Still further, the present invention permits on-line customer access to listenership reports and data. For these reasons, the system according to the disclosed embodiments of the instant invention has more utility and potential applications, and it is more practical and efficient in usage.

The present invention advantageously may take the form of various embodiments. A first embodiment consists of a remote radio listenership monitoring system comprising an antenna disposed in an area adjacent to automobiles carrying radio receivers, said radio receivers radiating intermediate frequency signals corresponding to the frequency amplified by said radio receivers, a digital scanning receiver operably connected to said antenna for receiving said radiated intermediate frequency signals, wherein said scanning receiver includes means for sensing the presence of an intermediate signal of a predetermined power level and means for sequentially polling a plurality of selected target frequencies, and said scanning receiver further includes means for reporting the frequency corresponding to a sensed intermediate signal which exceeds said predetermined level as a hit signal, a memory device, a local processing unit operably connected to said digital scanning receiver for receiving said hit signal and recording its occurrence in said memory device to form a listenership database, means for transmission of said listenership database from said memory device to an external device comprising a modem and conventional telephone link or cellular telephone link, and said external device comprises a general purpose computer, and wherein said general purpose digital computer comprises a long term memory storage device, central processing meansfor selectively accepting listenership database entries from a plurality of said local processing units, and means for creating a master database comprising a plurality of said listenership database entries.

A further embodiment consists of a remote radio listenership monitoring system comprising first and second antennae disposed in an area adjacent to automobiles carrying radio receivers, said radio receivers radiating intermediate frequency signals corresponding to the frequency amplified by said radio receivers and said intermediate frequency signals intercepted by said first and second antennae, a first filter circuit operably connected to said first antenna and adapted to pass frequencies above 98 MHz, a second filter circuit operably connected to said second antenna and adapted to pass frequencies of less than 2.2 MHz, a digital scanning receiver operably connected to said first and second filters for receiving said radiated intermediate frequency signals, wherein said scanning receiver includes means for sensing the presence of an intermediate signal of a predetermined power level and means for sequentially polling a plurality of target frequencies, and said scanning receiver further includes means for reporting the frequency corresponding to a sensed intermediate signal which exceeds said predetermined level as a hit signal, a memory device, and a local processing unit operably connected to said digital scanning receiver for receiving said hit signal and recording its presence in said memory device to form a listenership database.

A still further embodiment of the present invention consists of a remote radio listenership monitoring system comprising an antenna disposed in an area adjacent to automobiles carrying radio receivers, said radio receivers radiating intermediate frequency signals corresponding to the frequency amplified by said radio receiver, a digital scanning receiver operably connected to said antenna for receiving said radiated intermediate frequency signals, wherein said scanning receiver includes means for sensing the presence of an intermediate signal of a predetermined power level and means for sequentially polling a plurality of selected target frequencies defined by target frequency data, and said scanning receiver further includes means for reporting the frequency corresponding to a sensed intermediate signal which exceeds said predetermined level as a hit signal, a memory device, a local processing unit operably connected to said digital scanning receiver for receiving said hit signal and recording its presence in said memory device to form a listenership database, means for communication of data between said local processor and an external device, means for sending said listenership database over said means for communication, means for accepting new target frequency data from said external device over said means for communication, and means for updating said target frequencies of said digital scanner according to the new target frequency data; and wherein said external device comprises a general purpose computer, and wherein said general purpose digital computer comprises a long term memory storage device, processing means for selectively accepting listenership database entries from a plurality of said local processing units, means for creating a master database comprising a plurality of said listenership database entries, and means for selectively transmitting updated target frequency information to said local processing units.

In describing the invention, reference has been made to preferred embodiments. Those skilled in the art, however, and familiar with the disclosure of the subject invention, may recognize additions, deletions, substitutions, modifications, and/or other changes which will fall within the purview of the invention as defined in the following claims.

We claim:

1. A remote radio listenership monitoring system comprising:

a plurality of antennae disposed in an area adjacent to automobiles carrying radio receivers and operable to receive intermediate frequency signals that are radiated by said radio receivers, such intermediate frequency signals corresponding to the frequencies that are then being amplified by said radio receivers, wherein each of said antennae is optimized to receive such intermediate frequency signals within an assigned frequency band that is substantially non-overlapping with the other antennae's frequency bands;

a digital scanning receiver operably connected to said antennae for receiving said radiated intermediate frequency signals occurring within that antenna's assigned frequency band, said scanning receiver comprising an intermediate frequency detection circuit that is operable to scan the antennae's assigned frequency bands, said scanning receiver being further operable to report as "hit signals" instances where a received intermediate frequency signal exceeds a threshold power level;

a memory device; and a local processing unit operably connected to said digital scanning receiver and said memory device for receiving said "hit signals" and recording their occurrence in said memory device to form a listenership database, said local processing unit operable to record said "hit signals" when the received intermediate frequency signal exceeds said threshold power level more than a predetermined period after the last such occurence.

2. The remote radio listenership monitoring system of claim 1 further comprising a communications module connected to said local processing unit and operable to transmit said listenership database from said memory device to an external device.

3. The remote radio listenership monitoring system of claim 1 wherein one of said plurality of antennae is optimized to receive intermediate frequency signals associated with radio receivers for the commercial AM band.

4. The remote radio listenership monitoring system of claim 3 wherein another one of said plurality of antennae is optimized to receive intermediate frequency signals associated with radio receivers for the commercial FM band.

5. The remote radio listenership monitoring system of claim 2 and further comprising said external device, wherein said external device comprises:

a long-term memory storage device; and an external device central processing unit connected to said long-term memory storage device and operable to selectively accept listenership database entries from a plurality of said local processing units, to create a master database comprising a plurality of said listenership database entries, and to store said master data base in said long-term memory storage device.

6. A remote radio listenership monitoring system comprising:

first and second antennae disposed in an area adjacent to automobiles carrying radio receivers and operable to receive intermediate frequency signals that are radiated by said radio receivers, such intermediate frequency signals corresponding to the frequencies that are then being amplified by said radio receivers, wherein said first antenna is optimized to receive frequencies in the FM band, and said second antenna is optimized to receive frequencies in the AM band;

a first filter circuit operably connected to said first antenna and adapted to pass frequencies above approximately 98 MHz;

a second filter circuit operably connected to said second antenna and adapted to pass frequencies of less than approximately 2.2 MHz;

a digital scanning receiver operably connected to said first and second filters for receiving said radiated intermediate frequency signals, wherein said digital scanning receiver comprises:

a frequency scanning circuit to scan each antenna's assigned frequency band; and an intermediate frequency detection circuit connected to said first and second filters and operable to monitor the scan of each antenna's assigned frequency band, wherein said scanning receiver is further operable to report as hit signals instances where received intermediate frequency signals exceed a threshold power level;

a memory device; and a local processing unit operably connected to said digital scanning receiver and said memory, device for receiving said "hit signals" and recording their presence in said memory device to form a listenership database, said local processing unit operable to record said "hit signals" when the received intermediate frequency signal exceeds said threshold power level more than a predetermined period after the last such occurrence.

7. The remote radio listenership monitoring system of claim 6 further comprising a communications module connected to said local processing unit and operable to transmit said listenership database from said memory device to an external device.

8. The remote radio listenership monitoring system of claim 6 wherein said digital scanning receiver polls only selected target frequencies of each antenna's assigned frequency band, whereby said intermediate frequency detection circuit only tests the received intermediate signal against the threshold power levels at such target frequencies.

9. The remote radio listenership monitoring system of claim 8 wherein said digital scanning receiver further comprises a bandpass filter at the input to the intermediate frequency detection circuit, said bandpass filter being operable to limit the bandwidth assigned to each target frequency to a predetermined value.

10. The remote radio listenership monitoring system of claim 6 and further comprising said external device, wherein said external device comprises:

a long-term memory storage device;

an external device central processing unit that is operable to selectively accept listenership databases from a plurality of said local processing units and to create a master database comprising at least two of said accepted listenership databases.

11. A remote radio listenership monitoring system comprising:

an antenna disposed in an area adjacent to automobiles carrying radio receivers and operable to receive intermediate frequency signals that are radiated by said radio receivers, such intermediate frequency signals corresponding to the frequencies that are then being amplified by said radio receivers;

a digital scanning receiver operably connected to said antenna for receiving said radiated intermediate frequency signals, wherein said scanning receiver comprises:

a frequency scanning circuit to scan the antenna's assigned frequency band; and an intermediate frequency signal detection circuit operable to monitor the scan by said frequency scanning circuit wherein said scanning receiver is further operable to report as hit signals instances where received intermediate frequency signal exceeds a threshold power level;

a memory device;

a local processing unit operably connected to said digital scanning receiver and said memory device for receiving said "hit signals" and recording their presence in said memory device to form a listenership database, said local processing unit operable to record said "hit signals" only when the received intermediate frequency signal exceeds said threshold power level more than a predetermined period after the last such occurrence; and a communications module connected to said local processing unit operable to transmit said listenership database from said local processing unit to an external device and to accept new target frequency data from said external device.

12. The remote radio listenership monitoring system of claim 11 and further comprising an external device, wherein said external device comprises:

a long-term memory storage device; and an external device central processing unit that is operable to selectively accept listenership databases from a plurality of said local processing units and to create a master database comprising at least two of said accepted listenership databases.

13. The remote radio listenership monitoring system of claim 12 wherein said external device central processing unit creates said master database at 15-minute intervals.

14. The remote radio listenership monitoring system of claim 12 wherein said external device periodically contacts a host central computer and transfers said master database to said host central computer.

15. The remote radio listenership monitoring system of claim 12 and further comprising a host central computer that is operable to receive said master database from said external device and to produce a final report associated with a frequency of interest, wherein listenership data is organized in said final report by geographic distribution, demographic composition, and audience share with respect to other frequencies being monitored.

16. The remote radio listenership monitoring system of claim 15 and further comprising a customer interface unit that is responsive to remote customers via a remote computer connection whereby said customer has remote access to said final report or other reports.

17. The remote radio listenership monitoring system of claim 6 wherein approximately 0.3 seconds is the predetermined period after which the subsequent instance of the intermediate signal exceeding a threshold power level at a given frequency will be recorded.

18. The remote radio listenership monitoring system of claim 9 wherein the bandwidth of said bandpass filter is 5 KHz.

19. The remote radio listenership monitoring system of claim 10 wherein said long-term memory storage device is structured into at least one data array, each record of said array being a sixteen-bit group of memory cells that, by the electrical charges or absence of charges in the combination of sixteen cells, represents the frequency and time of the "hit signal" that is detected.

20. The remote radio listenership monitoring system of claim 4 wherein all commercial radio frequencies in a particular market are monitored.

* * * * *